United States Patent

[11] 3,622,075

| [72] | Inventor | Alfred W. Harris<br>Bellevue, Wash. |
|---|---|---|
| [21] | Appl. No. | 19,604 |
| [22] | Filed | Mar. 16, 1970 |
| [45] | Patented | Nov. 23, 1971 |
| [73] | Assignee | The Boeing Company<br>Seattle, Wash. |

[54] SELF-ACTUATING VARIABLE AREA ACOUSTIC JET ENGINE EXHAUST NOZZLE
13 Claims, 7 Drawing Figs.

[52] U.S. Cl. .................................................... 239/265.19,
  239/265.43
[51] Int. Cl. .................................................... B64c 15/06
[50] Field of Search ........................................... 239/265.11,
  265.33, 265.37, 265.19, 265.39, 265.17, 265.43

[56] References Cited
UNITED STATES PATENTS

| 3,527,409 | 9/1970 | Tumicki | 239/265.39 |
| 3,231,197 | 1/1966 | Strom | 239/265.39 X |
| 3,454,227 | 7/1969 | Motycka | 239/265.39 |

*Primary Examiner*—Lloyd L. King
*Attorneys*—Glenn Orlob and Bernard A. Donahue

ABSTRACT: A subsonic aircraft engine variable area nozzle comprising a plurality of pivotally mounted flap means which are essentially pressure balanced such that an aircraft velocity responsive control pressure obtained from the engine cowling structure can be utilized to obtain movement of said flap means into positions giving optimum nozzle exit areas for propulsive efficiency and sound suppression. The velocity responsive control pressures may be obtained from the cowling structure in the engine inlet or from the exterior surface of the nacelle cowling, and are delivered to an expansible control pressure chamber for flap actuation.

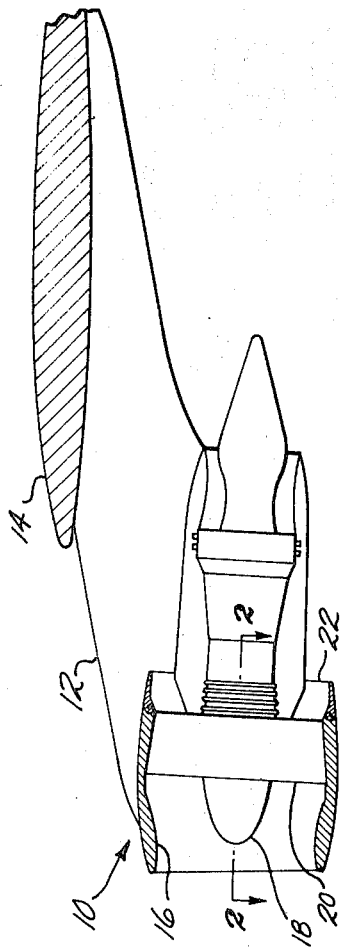
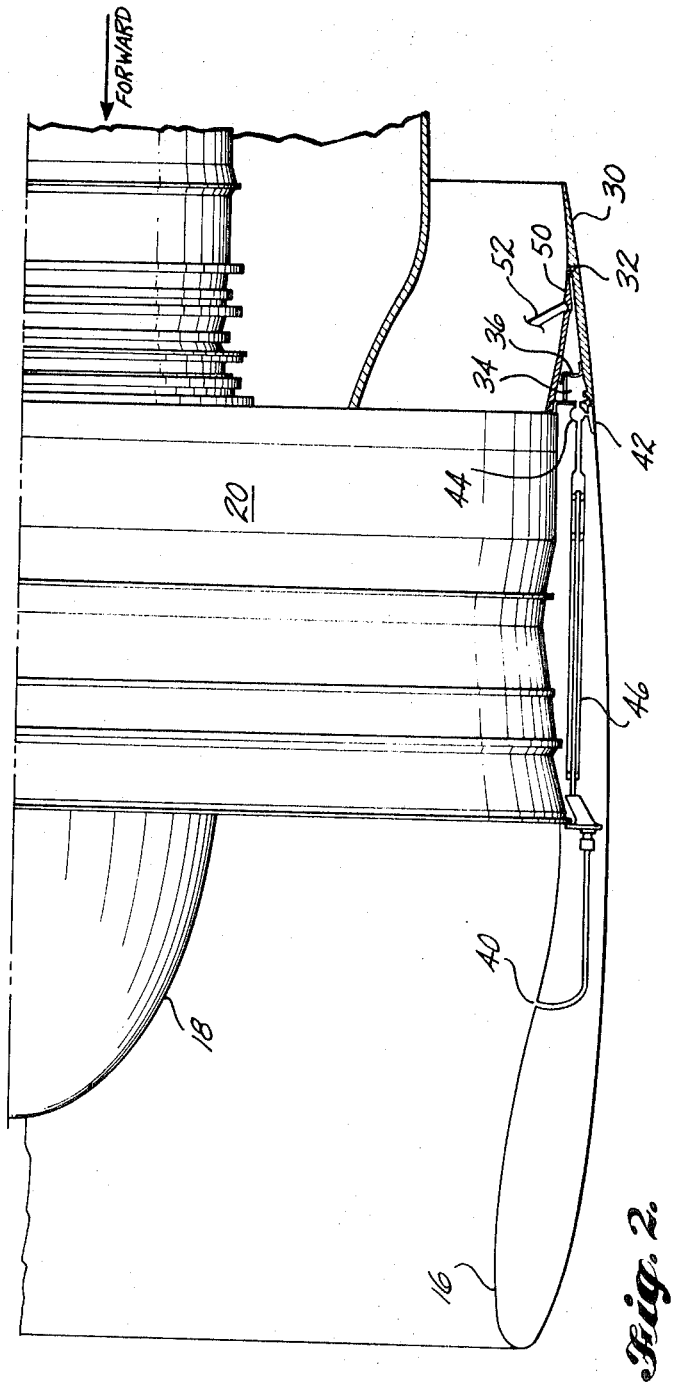

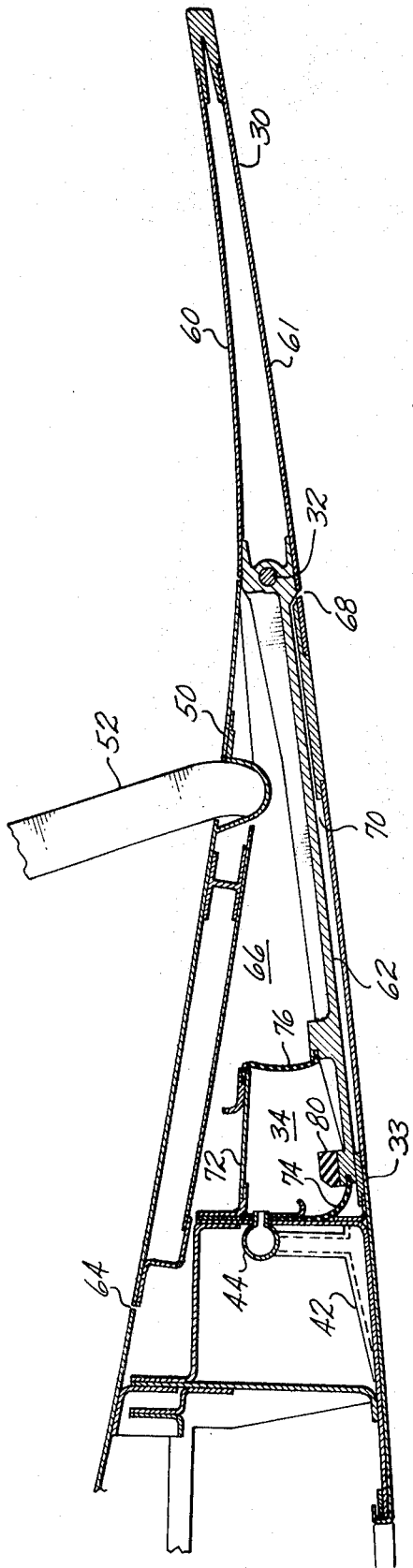
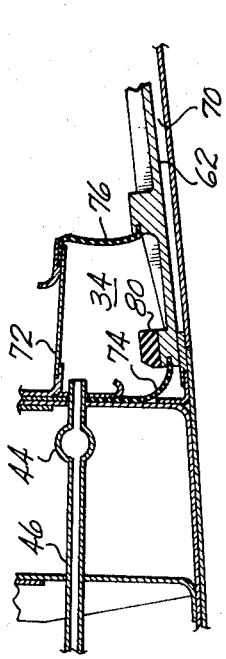
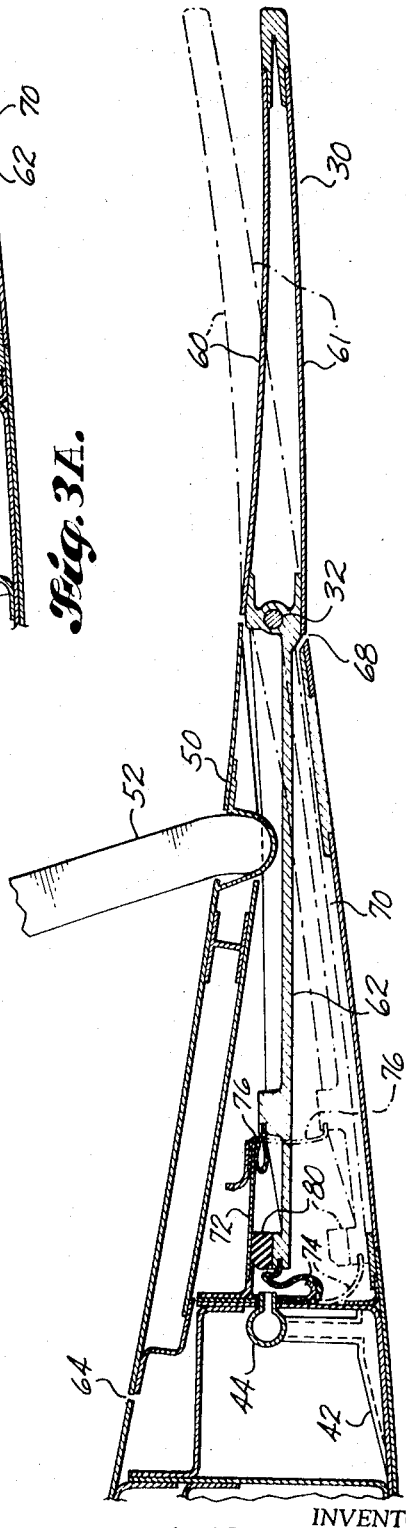
INVENTOR.
ALFRED W. HARRIS
BY
ATTORNEY

INVENTOR.
ALFRED W. HARRIS
BY
ATTORNEY

SELF-ACTUATING VARIABLE AREA ACOUSTIC JET ENGINE EXHAUST NOZZLE

This invention pertains to aircraft engine variable area exhaust nozzles and, more particularly to a self-actuating pressure balanced flap system for changing the nozzle exit area of a subsonic fan-type engine.

In aircraft jet engines it is well known that increased efficiency can be obtained by varying the exit area of the engine nozzle for various flight conditions. Many systems have been devised for accomplishing this purpose, particularly with respect to the nozzling problems associated with the transonic regime of supersonic flight. Such systems are usually positioned by control devices which involve complex manual or semiautomatic hydraulic or pneumatic actuation for displacing nozzle segments against the affects of engine and aerodynamic pressures. For transonic operation it is known to provide moveable flap segments which respond to the influence of nozzle pressure ratio (i.e., ratio of nozzle throat static pressure to outside ambient static pressure) to increase the nozzle exit plane area for supersonic flight. However, such systems are unsatisfactory for solving the problems of high-bypass ratio turbofan pressure matching at subsonic speeds, wherein an increased nozzle exit area is desirable for engine efficiency during takeoff, and a decreased area is desired for high-speed subsonic operation.

Further, the high noise levels generated by jet engines during takeoff are currently causing concern in the aircraft industry, with a trend toward more stringent noise level limitations being imposed by authorities. One source of random or white noise generation during takeoff is found in the local shearing action taking place between the periphery of the stream tube of gases departing the nozzle exit plane and the ambient air. Conventional fixed nozzles, and those variable nozzles in which only the throat area upstream of the nozzle area is adjusted, generate considerable noise from this local shearing action.

Accordingly, it is an object of this invention to provide a self-actuating and controlled variable area nozzle system for increased efficiency throughout the subsonic flight regime and a reduced noise level during low speed flight.

It is a related object of this invention to teach the use of self-actuating pressure balanced nozzle flap system which is directly responsive to aircraft velocity to provide optimum nozzle areas during takeoff and climbout as well as high-speed subsonic flight.

A further object of this invention is to teach the use of a self-actuating variable area nozzle, which is responsive to pressures obtained directly from the engine nacelle structure to provide an increased nozzle area and cone angle for takeoff and low-speed flight which automatically decreases for high-speed flight.

The above objectives are achieved in the preferred embodiment of the disclosed system by a pivotally mounted nozzle flap means which includes a balance panel portion acted upon by control pressures taken from the nacelle structure to provide a holding torque for automatically positioning and holding the flap means in either of two positions for optimum area and cone angle. A first position for takeoff and low-speed flight provides increased area and cone angle and improves propulsive efficiency while reducing random noise. A second position for cruise flight reduces area and cone angle for minimum drag and maximum thrust. By increasing the cone angle at takeoff in the manner disclosed, a reduction in the random noise level can be anticipated due to a smoother mixing of the exhaust stream with the ambient air. Further noise attenuation by attachment of acoustic lining, such as porous surface sandwich panels, to exposed surfaces is convenient in the disclosed design because nozzle adjustment is achieved by rotation of rigid surfaces which need not be deformed for area control.

FIG. 1 is a cross-sectional view of the wing and nacelle structure associated with a subsonic aircraft turbofan engine.

FIG. 2 is a fragmented section taken at 2—2 in FIG. 1, showing the inlet nacelle structure and nozzle flap means of the disclosed system.

FIG. 3 is an expanded sectional view illustrating applicant's flap means with control pressure obtained from the cowling exterior; the flap means being positioned for cruise flight.

FIG. 3a is a fragmented view showing the flap means served by alternative control pressures taken from the engine inlet interior cowling region.

FIG. 4 is a section view similar to FIG. 3 wherein the flap means have been displaced to a position for takeoff.

Figure 5:
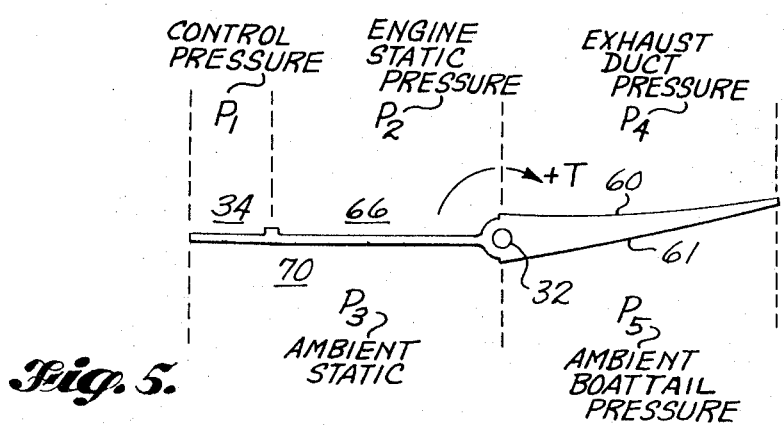

FIG. 5 schematically depicts the pressure balance of applicant's flap means.

Figure 6:
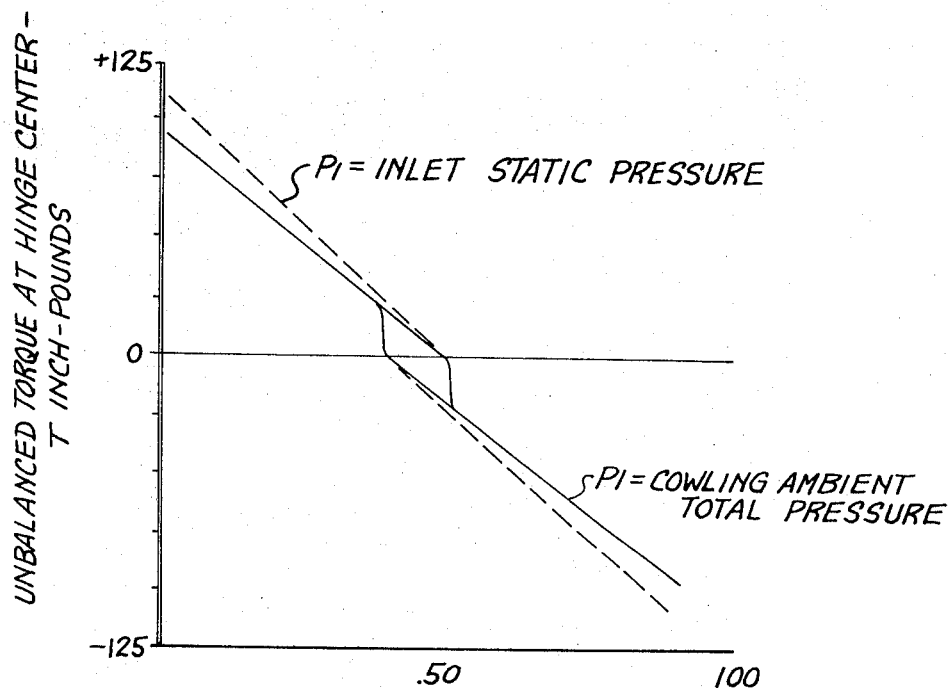

FIG. 6 provides a plot of available positioning torque versus Mach number throughout the subsonic flight regime.

Referring now to FIG. 1, a high-bypass ratio turbofan engine 10 is shown to be supported by strut structure 12 from a wing 14 of a subsonic aircraft. The installation includes fan cowling 16, engine centerbody 18, fan case 20 and fan exit passageway 22.

FIG. 2 is a sectional view taken at 2—2 in FIG. 1. Flap means 30 for varying the area of exhaust passageway 22 are pivotally mounted about a point 32 on cowling structure 16. As will later become apparent an expansible control pressure chamber 34 having flexible sidewalls 36 is utilized to provide a torque about point 32 for angular motion of flap means 30 with respect to cowling structure 16. The control pressure chamber 34 is served with an aircraft velocity responsive pressure. For example, either static engine inlet pressure or ambient total pressure (including both static and velocity components) from the cowling exterior surface may be used. In the embodiment shown, inlet pressure is drawn from tap 40 and ambient total pressure is obtained by a flush scoop 42.

It will be understood that the flap means of this invention are necessarily segmented when adapted for use with a circular or annular nozzle configuration. Applicant's flap means therefore involve a plurality of circumferentially spaced flap members and control pressure chambers. The control pressure chambers 34 are each served with pressure through an interconnecting manifold 44 which communicates with tap 40 and flush scoop 42. When used with a translating cowl thrust reverser system, the conduit 46 which interconnects tap 40 with manifold 44 is designed to be longitudinally expansible. A typical thrust reverser blocker door 50 and actuating linkage 52, which do not form part of the present invention, are shown in FIG. 2 for purposes of illustrating the compatibility of applicant's nozzle system with existing thrust reverser designs.

FIG. 3 is an expanded sectional view showing detail of applicant's pressure balanced flap means 30. As shown, the flap means is positioned for high speed flight, with balance panel portion 62 at rest and held against stop means 33 on the cowling structure. The flap means 30 comprises an exhaust duct portion 60 which forms a segment of the wall of the exhaust passageway, an outer boattail fairing portion 61, and a balance panel portion 62. The entire flap means 30 is pivotally mounted for angular displacement with respect to the cowl structure about pivot point 32. The balance panel portion 62 is acted upon on its inner side by engine exhaust duct static pressure drawn through an orifice 64 into an essentially sealed chamber 66 located within the interior of the cowling structure. On the opposite, or outer, side the balance panel portion 62 is acted upon by ambient static pressure within a sealed chamber 70. This pressure is drawn through orifice 68 from the exterior surface of the cowling.

The expansible control pressure chamber 34 can be seen to comprise a fixed inner wall 72, a forward flexible wall 74, an aft flexible wall 76, and an outer movable wall formed by the forward end portion of balance panel 62. Where temperature and pressure environment permits, as in the fan cowling embodiment here disclosed, the flexible walls 74 and 76 may be constructed of an inexpensive material such as rubberized dacron cloth. Where more severe environmental conditions are present, it may be desirable to construct the control pressure chamber 34 of more durable materials; for example, flexible metal bellows may be used.

It will be apparent then, that there are five distinct pressure forces acting upon flap means 30, each of which provides a torque about pivot point 32. These are as follows.

The control pressure $P_1$ acting within control pressure chamber 34 upon the forward end of balance panel 62 tends to cause a counterclockwise torque about point 32. An appropriately high value of $P_1$ will tend to hold flap means 30 in the high speed position, against stop means 33, as shown in FIG. 3.

The engine exhaust duct static pressure $P_2$ acts within chamber 66 and tends to produce a counterclockwise torque.

The ambient static pressure $P_3$ from the exterior surface of the cowling acts within chamber 70 on balance portion 62, and tends to produce a clockwise torque about point 32.

Exhaust duct pressure $P_4$ acts upon exhaust duct portion 60 to produce a clockwise torque about point 32 of flap means 30.

Ambient static pressure $P_5$ acts upon boattail fairing portion 61 to produce a counterclockwise torque about pivot point 32.

The values of pressures $P_1$ through $P_5$ may be closely estimated for any given engine installation and flight profile. The torque input of these pressure forces may be adjusted by changing the effective length of the exhaust duct portion and by changing the length and area relationships of the balance panel portion forward of pivot point 32. These parameters may be adjusted to maintain the flap means 30 in either the high speed position of FIG. 3 or the takeoff position shown in FIG. 4 for virtually any desired portion of the flight profile.

As has been discussed previously, increased propulsive efficiency may be obtained by increasing the effective nozzle area for takeoff and decreasing it for high speed flight. Also, an increased nozzle cone angle and area are desirable during takeoff and approach for reduction in noise levels generated by shearing action between the exhaust stream and the ambient air.

In order to automatically obtain and hold proper positioning of flap means 30 in either the high speed or takeoff mode, a control pressure which varies as a function of aircraft velocity is used. One such pressure is the ambient total pressure (including static and velocity components) acting on the exterior of the cowling structure. In the FIG. 3 embodiment this ambient total pressure is obtained by means of a conventional flush scoop 42 which communicates with the exterior surface of the cowling. Other means for obtaining this pressure would include the traditional sugar scoop pickup which also obtains pitot total pressure.

The FIG. 3a embodiment illustrates the use of a different velocity responsive control pressure, viz, engine inlet static pressure obtained by means such as tap 40 (shown in FIG. 2) and served by means of conduit 46 to manifold 44 and hence to control pressure chamber 34. For most designs either of these two velocity responsive control pressures will be satisfactory; the engine inlet pressure offering somewhat more sensitivity at low velocity, but requiring a more extensive conduit system for connection to manifold 44. In certain isolated design situations is may be desirable to use both of these sources for the control pressure.

FIG. 4 shows applicant's flap means 30 in the takeoff or low speed flight position. On the ground prior to takeoff, control pressure in chamber 34 is at its minimum value, engine inlet pressure typically approximating $-2$ p.s.i.g. and the cowling ambient total pressure approximately 0 p.s.i.g., thereby allowing flap means 30 to pivot in response to the pressure forces generated by $P_2$–$P_5$ into a position for increased nozzle cone angle and exit area. The expansible control pressure chamber 34 as shown in FIG. 4 is at its minimum volume, which is preferably defined by stop means such as bumper block 80.

FIG. 5 provides a schematic of the force balance system of applicant's flap means. The pressures $P_1$–$P_5$ can be seen to act over designated areas of the flap to cause an unbalanced holding torque T which will maintain the desired flap position. It will be apparent that the control pressure $P_1$, and control pressure chamber 34 may be selected and designed to provide an unbalanced holding torque T for actuation of the system as desired.

FIG. 6 is a plot of available unbalanced holding torque vs. Mach number for a typical fan engine installation. The plot shows holding torque when the control pressure $P_1$ is obtained either from the engine inlet (dotted line), or from the exterior cowling (solid line). These particular curves show a crossover area at about $M=0.50$ wherein the holding torque shifts from positive values tending to hold the flap means in the low speed position, to negative values which will move the flap means to the high-speed position and hold them there until velocity is reduced. The vertical line portions which resemble an envelope in the crossover area are typical of boattail instability inherent in installations of this type. It should be apparent that the crossover area may be designed to occur at any desired Mach number. The $M=0.50$ crossover shown was designed for a particular engine and flight profile to maintain the takeoff nozzle configuration until an altitude of approximately 1,000 feet is achieved.

It should be noted that the preferred embodiment here presented has been geometrically designed to be entirely fail safe. That is, in the event of loss of an entire flap means 30 from the aircraft (for example, because of impact with a foreign object) the remaining cowl structure will serve as a properly sized nozzle to prevent turbine overspeed or an excessive turbine inlet temperature condition. Also, it should be noted that the design shown is fail safe for takeoff conditions in that a loss of the control pressure $P_1$ for any reason will cause the nozzle to remain in the takeoff or low speed flight position.

It will be appreciated from the foregoing description that applicant's system provides a simple, relatively inexpensive means of nozzle area and cone angle control which can be entirely self-actuating for movement into its proper position at the desired aircraft velocity condition. While the preferred embodiment illustrates a fan engine nozzle, it is apparent that application to other engine nozzles may be achieved with only minor modification. Also, while applicant's pressure balanced flap design has been shown to be self-actuating through use of a velocity responsive control force, it is apparent that other relatively low-level control forces including manual actuation with a simple hydraulic actuator could advantageously be used in certain cases where automatic actuation is not considered essential.

What is claimed is:

1. A self-actuating variable area nozzle apparatus for use in combination with a cowl structure and exhaust passageway associated with an aircraft jet engine comprising:

a plurality of pivotally mounted flap means attached to said cowl structure, said flap means including an exhaust duct portion which forms a segment of the wall of said exhaust passageway and a balance panel portion, means for obtaining a velocity responsive control pressure which is independent of pressures in said exhaust passageway from a surface of said cowl structure, means for supplying a force proportional to said control pressure to said balance panel portion, wherein said control pressure varies with a change in aircraft velocity and said force acts upon said balance panel portion to displace said exhaust duct portion to reduce the effective area of said exhaust passageway upon an increase in aircraft velocity.

12. The apparatus of claim 1 wherein said exhaust duct portion additionally forms a portion of the outer peripheral wall of said nozzle and wherein said apparatus further includes:

means for supplying engine exhaust duct pressure to said balance panel portion, means for supplying ambient static pressure acting on the exterior surface of said cowl to said balance panel portion, wherein said engine exhaust pressure and said ambient static pressure act on said balance panel in opposite directions and said control pressure acts to provide an unbalanced force, considering all pressure forces acting upon said flap means, tending to move said exhaust duct portion in response to a change in aircraft velocity.

3. The apparatus of claim 2 wherein said control pressure is obtained from the interior wall of the inlet cowling of said engine.

4. The apparatus of claim 2 wherein said control pressure is obtained from the exterior wall of said cowling and said means for supplying said control pressure includes means for obtaining a pitot total pressure which includes static and velocity components.

5. The apparatus of claim 1 wherein said means for supplying a force proportional to said control pressure includes flexible means defining the wall structure of an expansible chamber.

6. The apparatus of claim 5 wherein said means for supplying engine exhaust pressure to said balance panel portion includes orifice means communicating between the engine exhaust passageway and said balance panel and said means for supplying ambient static pressure includes orifice means communicating between the exterior surface of said cowl and said balance panel.

7. The apparatus of claim 1 wherein said flap means are mounted for rotary motion about a pivot located at the trailing edge of said cowl structure, said exhaust duct portion extending aft of said pivot and comprising an inner surface forming a segment of the wall of said exhaust passageway and an outer surface forming an aerodynamic continuation of the exterior surface of said cowl structure, and said balance panel portion extends forward of said pivot within the interior of said cowl structure.

8. The apparatus of claim 7 wherein said control pressure is obtained by scoop means from the aerodynamic free stream acting over the outer exterior surface of said cowl, wherein said scoop means comprises means for obtaining a pitot total pressure which includes static and velocity components.

9. The apparatus of claim 7 wherein said control pressure is obtained from the interior wall of the inlet cowling of said engine.

10. The apparatus of claim 1 wherein said means for supplying a force proportional to a control pressure includes an expansible chamber attached to an end portion of said balance panel, said expansible chamber having flexible side walls and an end wall affixed to the interior cowl structure.

11. The apparatus of claim 10 wherein said exhaust duct portion of said flap means comprises a surface lined with acoustical material and attached to a porous honeycomb core material.

12. A two-position variable area nozzle apparatus for use with a jet engine having a cowl structure and a longitudinally extending exhaust passageway, said apparatus comprising:

flap means mounted for angular movement about a pivot located on said cowl structure, said flap means including an exhaust duct portion extending longitudinally aft of said pivot and forming a segment of a wall of said passageway, and a balance panel portion extending longitudinally forward of said pivot and into an interior portion of said cowl structure and dividing said interior portion into two chambers each capable of sustaining fluid under pressure, means for supplying engine exhaust duct pressure to one of said two chambers, means for supplying ambient static pressure to the other of said two chambers, first stop means cooperating with said flap means to define a first angular position of said flap means wherein a given nozzle cone angle and exit area are established, second stop means cooperating with said flap means to define a second angular position of said flap means wherein a nozzle cone angle and exit area smaller than said given nozzle cone angle and exit area are established, force means acting on said balance panel portion for holding said flap means in either said first angular position or said second angular position, wherein said force means can be used to optionally move said flap means and hold said flap means in the one of the two positions which results in the higher propulsive efficiency for the engine.

13. The apparatus of claim 12 wherein said force means comprises a fluid pressure responsive expansible chamber which is defined by rigid end walls which are connected by flexible sidewalls.

* * * * *